US012305541B2

(12) United States Patent
Berthelemy

(10) Patent No.: US 12,305,541 B2
(45) Date of Patent: May 20, 2025

(54) CARTRIDGE FOR A HEAT ENGINE HAVING A THERMODYNAMIC CYCLE AND ASSOCIATED HEAT ENGINE

(71) Applicant: CIXTEN, Souffelweyersheim (FR)

(72) Inventor: Pierre-Yves Berthelemy, Souffelweyersheim (FR)

(73) Assignee: CIXTEN, Souffelweyersheim (FR)

(*) Notice: Subject to any disclaimer, the term of this patent is extended or adjusted under 35 U.S.C. 154(b) by 0 days.

(21) Appl. No.: 18/550,366

(22) PCT Filed: Mar. 15, 2022

(86) PCT No.: PCT/EP2022/056723
§ 371 (c)(1), (2) Date: Sep. 13, 2023

(87) PCT Pub. No.: WO2022/194877
PCT Pub. Date: Sep. 22, 2022

(65) Prior Publication Data

US 2025/0116212 A1 Apr. 10, 2025

(30) Foreign Application Priority Data

Mar. 17, 2021 (FR) ........................................ 2102658

(51) Int. Cl.
*F01K 7/00* (2006.01)
*F01K 7/32* (2006.01)
(Continued)

(52) U.S. Cl.
CPC ................ *F01K 7/32* (2013.01); *F01K 25/08* (2013.01); *F01K 25/10* (2013.01); *F02G 1/044* (2013.01)

(58) Field of Classification Search
CPC .......... F01K 7/32; F01K 25/08; F01K 25/103; F02G 1/044
See application file for complete search history.

(56) References Cited

U.S. PATENT DOCUMENTS 6,945,044 B2 * 9/2005 Gimsa .................. F02G 1/0435 92/52
2020/0347799 A1 * 11/2020 Schmitt .................... F01K 7/36

FOREIGN PATENT DOCUMENTS

DE 19938023 A1 4/2000
DE 102009020417 A1 11/2010
(Continued)

OTHER PUBLICATIONS

English Translation WO-0201052-A2 (Year: 2002).*
(Continued)

*Primary Examiner* — Shafiq Mian
(74) *Attorney, Agent, or Firm* — Leason Ellis LLP

(57) ABSTRACT

The invention relates to a cartridge (1) for the displacement of a thermodynamic fluid for a heat engine, the cartridge being characterised in that it comprises: a first profile section (2) comprising first circulation means (3) for circulating a heat transfer fluid; a second profile section (8) comprising second circulating means (9) for circulating a heat-transfer fluid; a third profile section (15) being able and intended to be connected to at least one supply circuit of at least one working fluid (J, H), said third profile section (15) being placed inside the first profile section (2) and the second profile section (8); a chamber (24) for containing a thermodynamic fluid; a displacer (25) placed within said chamber (24) and mounted so as to be capable of sliding relative to the outer wall (17) of said third profile section (15); a piston (26) placed inside said third profile section (15) and mounted so as to be capable of sliding relative to the inner wall (16) of said third profile section (15), the piston (26) being able and intended to be moved by said at least one working fluid (J, H), the displacer (25) and the piston (26) being coupled to each other.

20 Claims, 19 Drawing Sheets

Figure 1:
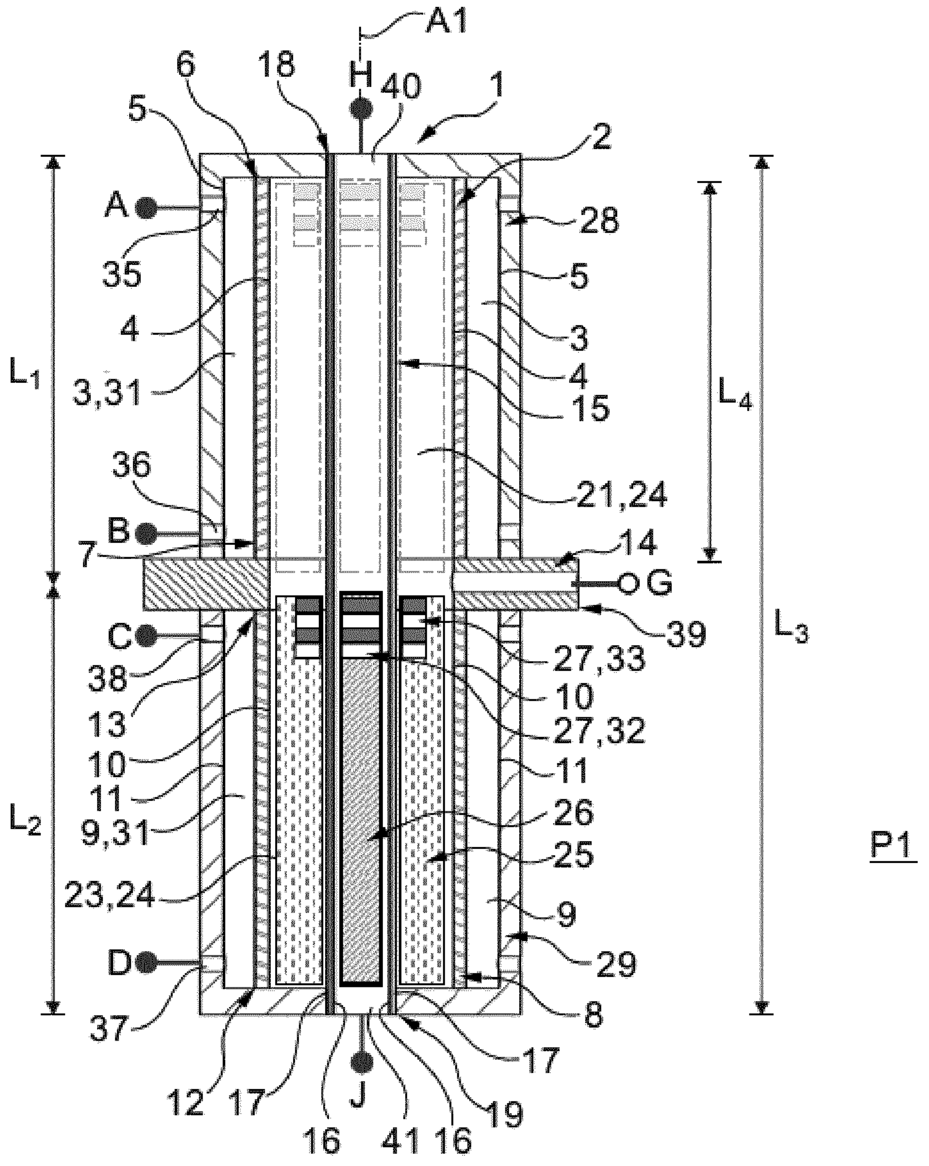

(51) Int. Cl.
*F01K 25/08* (2006.01)
*F01K 25/10* (2006.01)
*F02G 1/044* (2006.01)

(56) References Cited

FOREIGN PATENT DOCUMENTS

| | | | | |
|---|---|---|---|---|
| DE | 102013114159 A1 | 10/2014 | | |
| EP | 1411235 A1 | 4/2004 | | |
| WO | WO-0201052 A2 * | 1/2002 | ............... | F02G 3/00 |
| WO | 2002088536 A1 | 11/2002 | | |
| WO | 2005042958 A1 | 5/2005 | | |
| WO | 2014187558 A2 | 11/2014 | | |
| WO | 2016165687 A1 | 10/2016 | | |
| WO | 2018062627 A1 | 4/2018 | | |
| WO | 2019143520 A1 | 7/2019 | | |

OTHER PUBLICATIONS

International Search Report and Written Opinion for corresponding International Application No. PCT/EP2022/056723, dated Jul. 15, 2022.

* cited by examiner

CARTRIDGE FOR A HEAT ENGINE HAVING A THERMODYNAMIC CYCLE AND ASSOCIATED HEAT ENGINE

CROSS-REFERENCE TO RELATED PATENT APPLICATIONS

This application is a U.S. National Stage Application under 35 U.S.C. § 371 of International Patent Application No. PCT/EP2022/056723 filed Mar. 15, 2022, which claims the benefit of priority of French Patent Application number 2102658 filed Mar. 17, 2021, both of which are incorporated by reference in their entireties. The International Application was published on Sep. 22, 2022, as International Publication No. WO/2022/194877.

The present invention relates to the field of thermodynamic cycle heat engine cartridges and associated thermodynamic cycle heat engine modules.

The current energy transition gives raising challenges in a number of areas, including the reduction of primary energy consumption. The industrial sector produces large quantities of thermal energy, most of which is still rejected in the form of waste heat. This waste heat represents an enormous source of energy, directly available and already paid for, and its recovery is a strategic challenge for industry. Waste heat can be recovered either by direct supply to heat networks, or by temporary storage, or by conversion into electricity for internal or external use. For low-temperature waste heat, i.e. below 100 degrees Celsius, there is currently no commercially viable machine for conversion into electricity, due to a lack of economic viability, the use in heat networks being the only possible alternative. However, there are a number of constraints on implementation, not least the need to be close to the end use.

Current developments in machines with external heat input are therefore limited for temperatures where the heat reservoir is ultimately less significant.

Other natural sources of heat are readily available, such as low-temperature geothermal energy or solar thermal energy. Today, these renewable resources are only used for heating networks.

Machines with an external heat supply and a closed-cycle working fluid without phase change are generally referred to as Stirling engines. In particular, Stirling engines of the beta or gamma type have a working piston and a displacer to transfer the working fluid alternately from the hot to the cold side. In this type of motor, the working piston and displacer are mechanically linked. These motors are characterized by very low power density and difficult power control, as the speed of rotation depends mainly on the temperature difference between the sources. The few machines on the market therefore require a large temperature difference between the heat sources, often of the order of several hundred degrees Celsius, to compensate for the low thermal conductivity of the working gases employed, the small heat exchange surfaces and the dead volumes of the regenerator.

To improve power density, we know from publication WO2018062627A1 that certain Stirling engines have been developed to operate with a pressurized gas, or even with a fluid in the supercritical phase, such as carbon dioxide. However, the very high pressures required, combined with high motor rotation speeds, typically of the order of 3,000 rpm, lead to problematic losses due to friction and pumping of the working fluid. In the case of the working pistons, the ability of the dynamic seals to withstand high pressures and temperatures also remains a challenge, to ensure a certain longevity for the engine and avoid leaks.

Another concept in this category of machine utilizing the properties of near-critical carbon dioxide is proposed in publication W002/01052A2, in which the working fluid is not moved, but the heat sources are alternately brought into contact with the fluid via movable heat shields. This system is constructively complex to implement, due to the alternating hot and cold sources to be integrated into each cylinder. This configuration generates significant heat losses, notably via the thermal screens that are successively brought into contact with the heat sources, which do not contribute directly to heating or cooling the fluid like a conventional regenerator.

Publication WO2016/165687A1 also describes a heat conversion process with a supercritical cycle using carbon dioxide, in which expansion is isothermal thanks to an oscillator system. The oscillating piston, which must be controlled according to the stroke of the working piston, functions as an active stirrer of the supercritical fluid during expansion to increase convective heat transfer. The complexity of construction, due to the integration in each cylinder of the oscillator, regenerator, pistons and displacer, makes this concept unattractive for large-scale installations and production. In addition, the improvement in heat transfer by increasing convection in the cylinder is limited by the cylinder's small contact area with heat sources. The concept is therefore designed to operate with a temperature difference in excess of 150 degrees Celsius.

Developments in the so-called Free Piston Stirling Engine (FPSE) have led to attempts to limit heat loss between the hot and cold sources, in order to increase motor efficiency. Publication W02005/042958 proposes integrating the regenerator in a low-thermal-conductivity ceramic part connecting the hot and cold parts. However, this configuration does not allow the displacer to be controlled, and the electrical generator must be integrated into each piston, which becomes problematic for high-power installations requiring several cylinders.

A multi-cylinder external heat transfer engine architecture is proposed in publication WO02088536. The "liquid" displacer technique used and the series connection of the pistons for transferring the thermodynamic fluid from one piston chamber to another does not allow management of the position of the thermodynamic fluid independent of the working fluid, and therefore does not allow optimization of the thermodynamic cycle achieved.

In a conventional Stirling engine, the mechanical coupling between displacer and working piston does not allow thermodynamic transformations to be carried out correctly due to the continuous rotation, thus greatly reducing the actual efficiency of this type of engine. The pressure chamber cannot be properly sealed at high pressures (>10 bar) due to high rotation speeds, resulting in high friction losses. Heat transfer is very low at low temperatures, leading to very low power densities.

Mechanical decoupling of displacers and working pistons, which as explained in the state of the art enables better control of thermodynamic transformations with a view to improving efficiency, requires in current solutions the addition of additional external actuator systems, as displacers are no longer driven by engine rotation. In the case of multi-cylinder engines, these systems become very complicated and costly to implement, as each displacer in each cylinder requires an actuator.

The aim of the present invention is to provide a scalable, modular solution for operating heat sources with temperatures below 150 degrees Celsius.

To this end, the invention concerns a cartridge for moving a thermodynamic fluid between a cold part connected to a first heat source and a hot part connected to a second heat source for a thermodynamic cycle heat engine, characterized in that it comprises at least:

- a first heat exchanger, forming a so-called cold part, comprising a first hollow profile including first means for circulating at least one heat-transfer fluid adapted and intended to be connected to a first heat-transfer fluid supply circuit connected to a first heat source, said first profile comprising an inner wall and an outer wall,
- a second heat exchanger, forming a so-called hot part, comprising a second hollow section comprising second means for circulating at least one heat-transfer fluid suitable and intended for connection to a second heat-transfer fluid supply circuit connected to a second heat source, said second section comprising an inner wall and an outer wall,
- a third hollow section suitable and intended for connection to at least one supply circuit for at least one working fluid, said third section being arranged inside the first section and the second section, said third section comprising an inner wall and an outer wall,
- at least part of the inner wall of the first section and a first part of the outer wall of the third section being spaced apart and facing each other to form a first filling space,
- at least part of the inner wall of the second profile and a second part of the outer wall of the third profile being spaced apart and facing each other so as to form a second filling space,
- at least one chamber adapted and designed to contain at least one thermodynamic fluid preferably at high pressure and in the supercritical state, said chamber comprising at least the first filling space and the second filling space which are communicating,
- at least one displacer disposed inside said chamber and slidably mounted relative to the outer wall of said third profile and movable between a first position and a second position, and configured to alternately displace said at least one thermodynamic fluid between the first filling space and the second filling space,
- a piston disposed inside said third profile and slidably mounted relative to the inner wall of said third profile and movable between the first position and the second position, the piston being adapted and intended to be moved by said at least one working fluid between the first position and the second position.

The displacer and piston are coupled to each other.

The invention also relates to a module for moving a thermodynamic fluid alternately between a cold part connected to a first heat source and a hot part connected to a second heat source for a thermodynamic cycle heat engine, characterized in that it comprises at least one cartridge or a plurality of cartridges according to the invention, and in that it comprises:

- a first heat transfer fluid supply circuit connected to said first circulation means of said at least one cartridge via at least one first supply port and at least one second supply port of the first circulation means,
- a second heat transfer fluid supply circuit connected to said second circulation means of said at least one cartridge via at least one third supply port and at least one fourth supply port of the second circulation means,
- a junction plate comprising at least said cartridge junction means,
- a working fluid supply circuit, connected to said third profile of said at least one cartridge by at least one fifth supply port which the third profile comprises and at least one sixth supply port which the third profile comprises, arranged to control the displacement of the piston,
- a thermodynamic fluid supply outlet connected to the chamber of said at least one cartridge or a hydraulic fluid supply outlet connected to the first filling space or the second filling space of said chamber.

Figure 2:
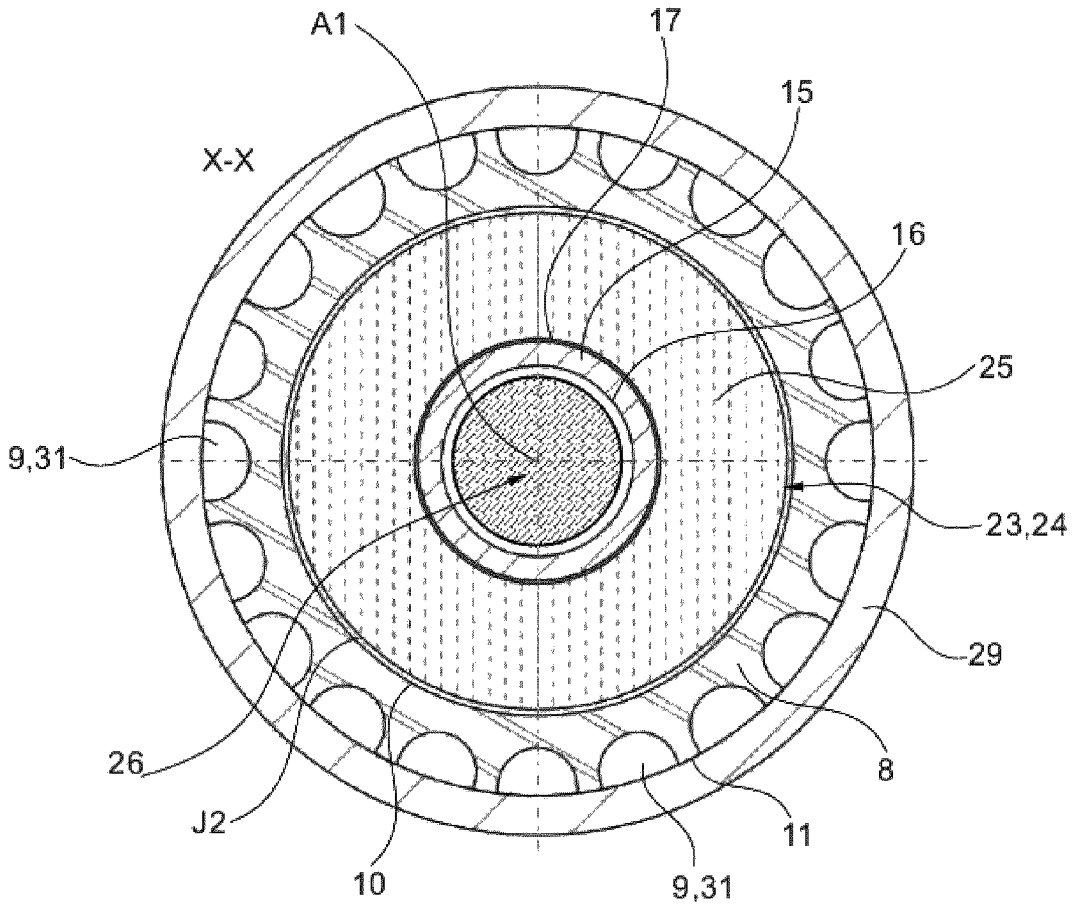
Figure 3:
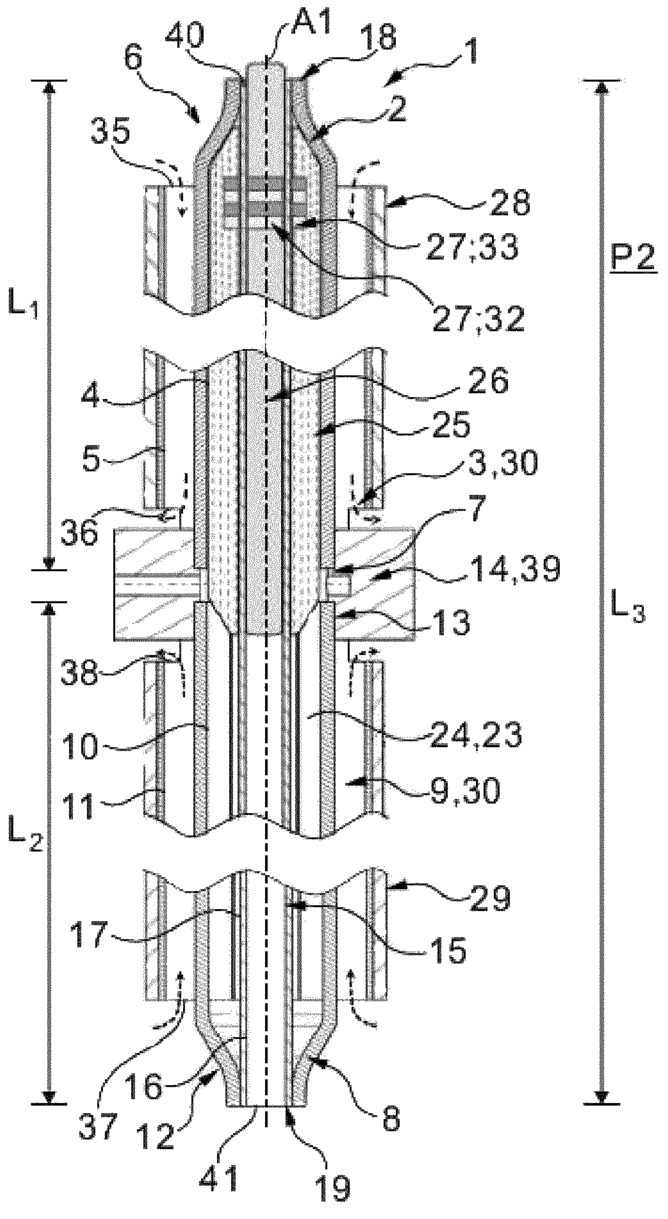
Figure 4:
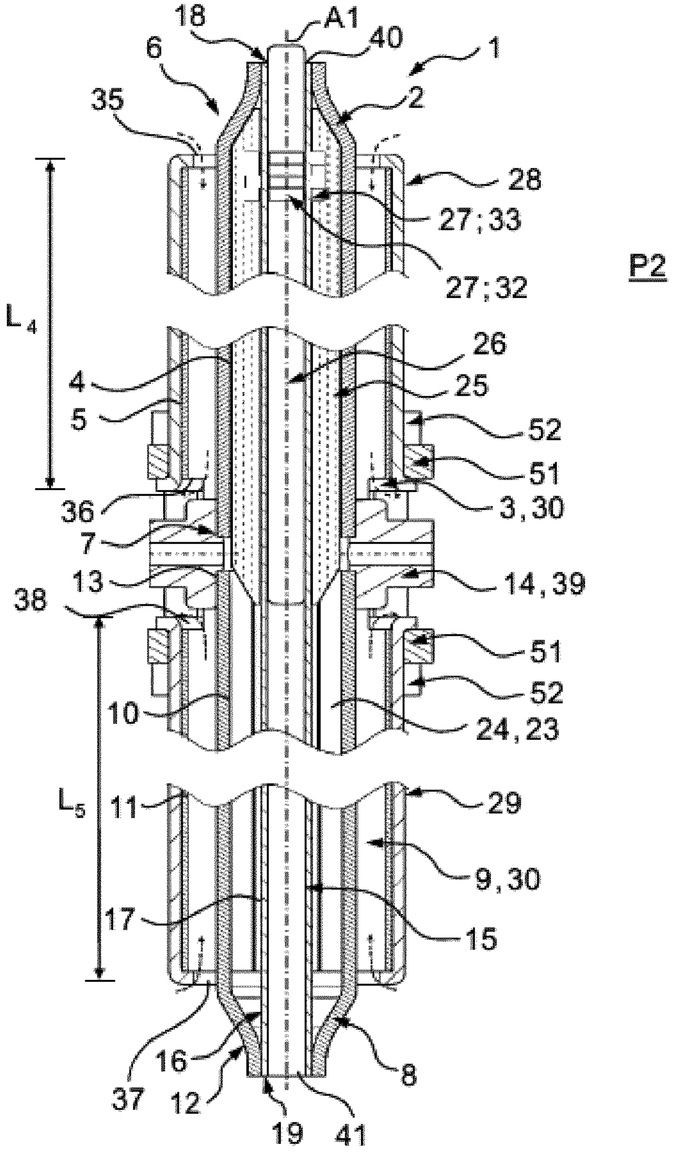
Figure 5:
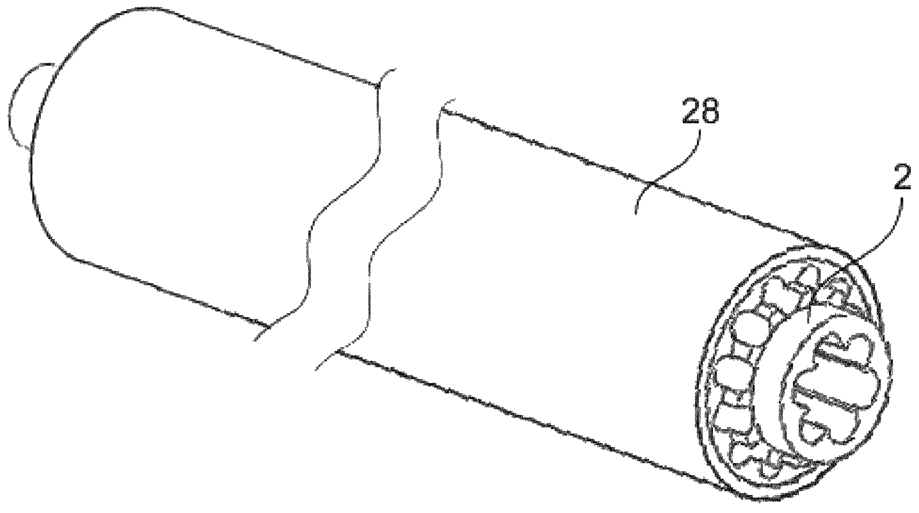
Figure 6:
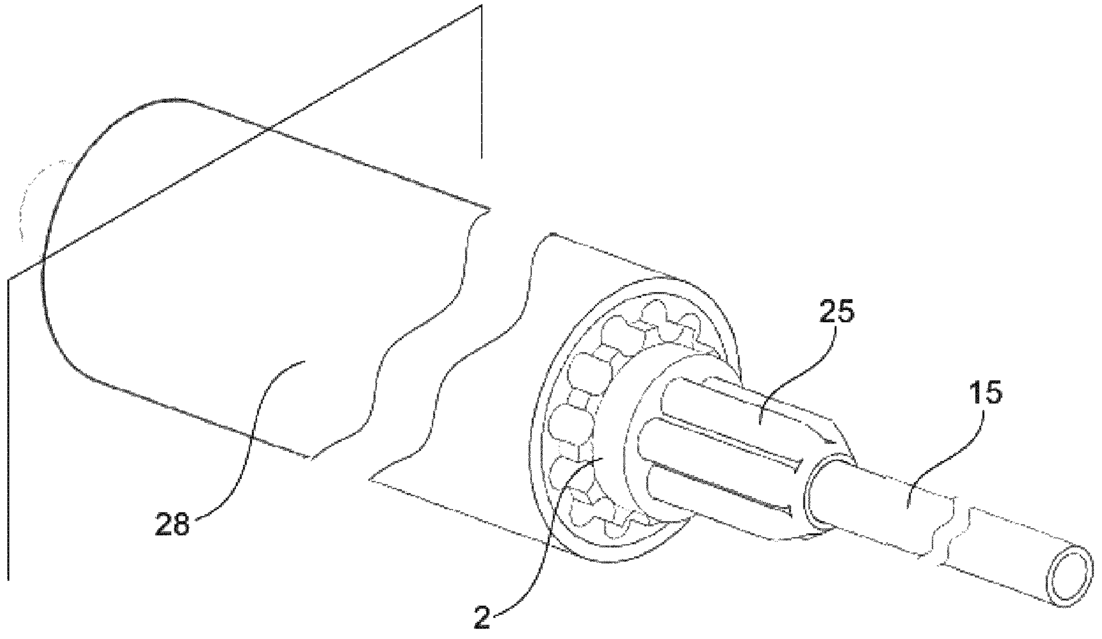
Figure 7:
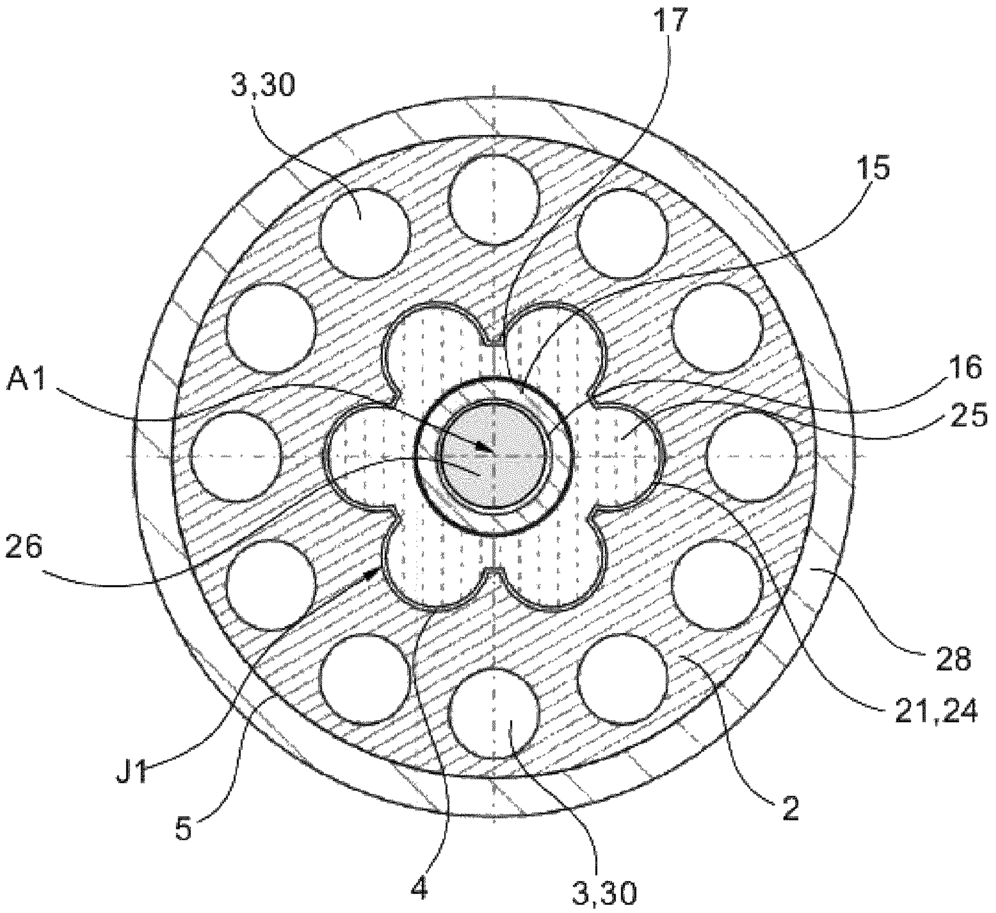
Figure 8:
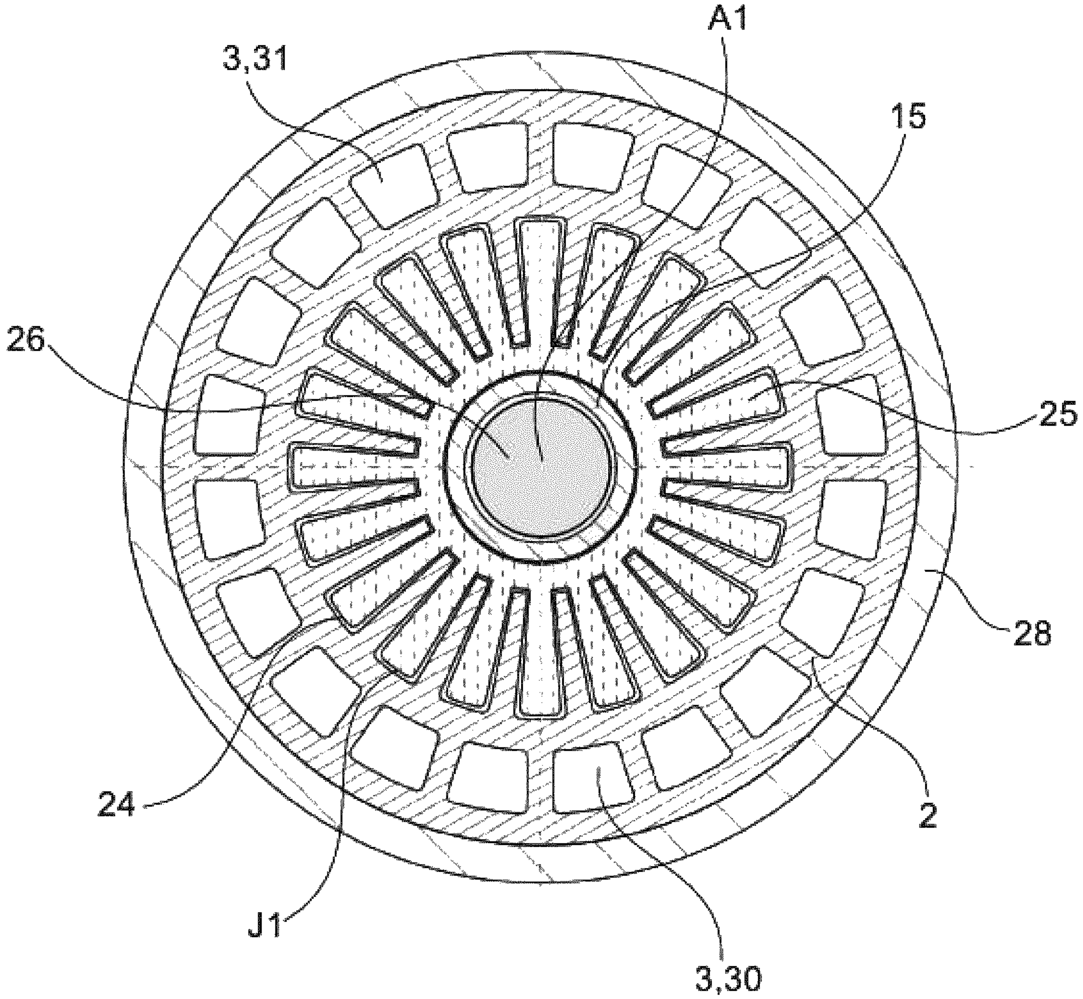
Figure 9:
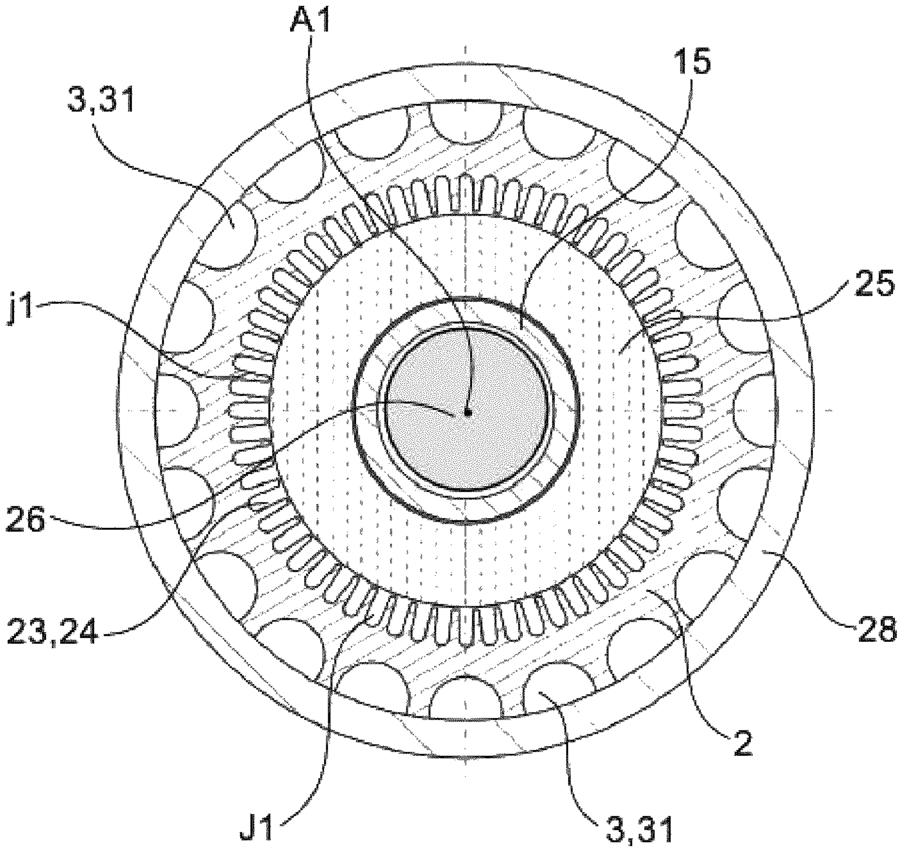
Figure 10:
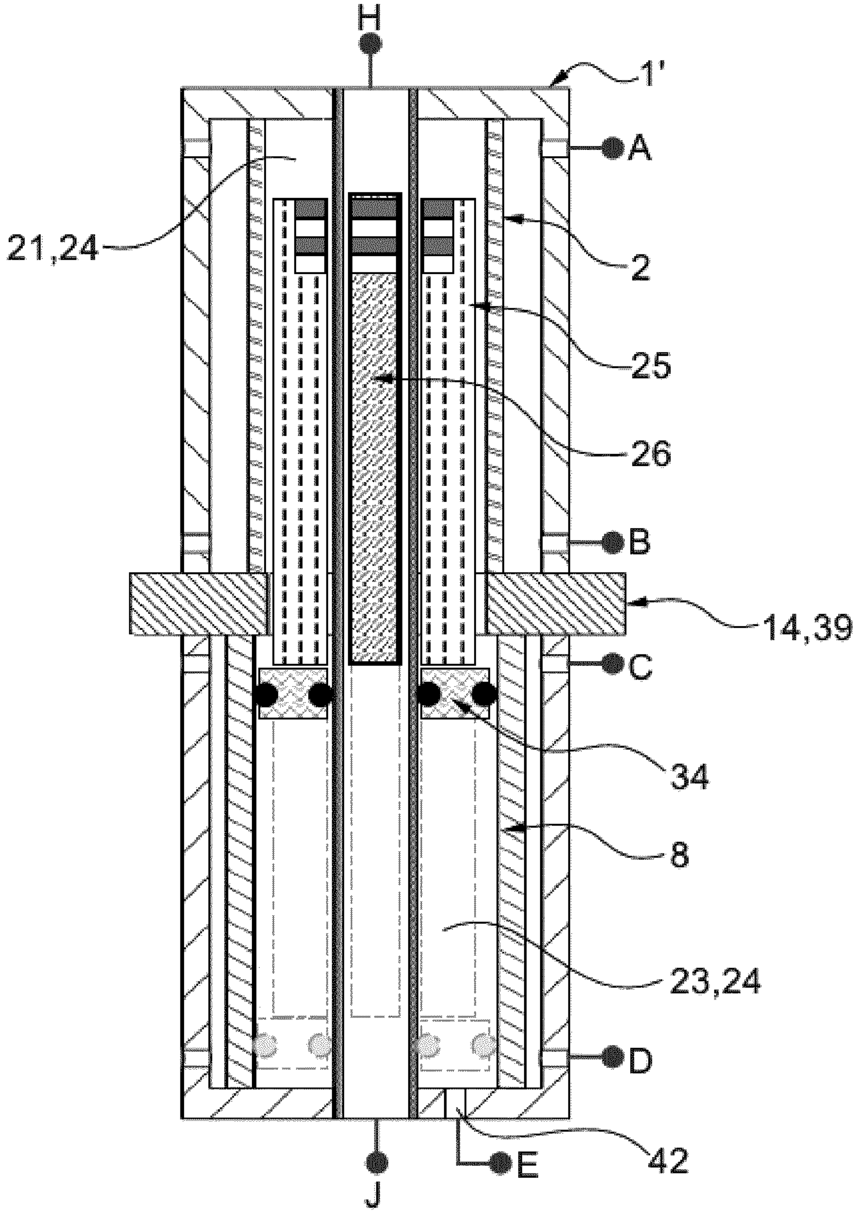

The invention will be better understood from the following description, which refers to several preferred embodiments, given as non-limiting examples, and explained with reference to the appended schematic drawings, in which:

FIG. 1 shows a cross-sectional view of a cartridge according to the invention, FIG. 2 shows a transverse-sectional view of the cartridge shown in FIG. 1, FIG. 3 shows a cross-sectional view of a cartridge according to a first embodiment of the invention, FIG. 4 shows a cross-sectional view of a cartridge according to a second embodiment of the invention, FIG. 5 shows a perspective view of part of the cartridge according to the first embodiment of the invention, FIG. 6 shows a perspective view of part of the cartridge according to the first embodiment of the invention, FIG. 7 represents a cross-sectional view of the cartridge according to the invention, showing circulation means in the form of channels of circular cross-section, FIG. 8 shows a cross-sectional view of the cartridge according to the invention, showing circulation means in the form of channels with a trapezoidal cross-section, FIG. 9 shows a cross-sectional view of the cartridge according to the Invention, with circulation means in the form of open grooves, FIG. 10 shows a cross-sectional view of a so-called hybrid cartridge in a third embodiment of the invention.

Figure 11:
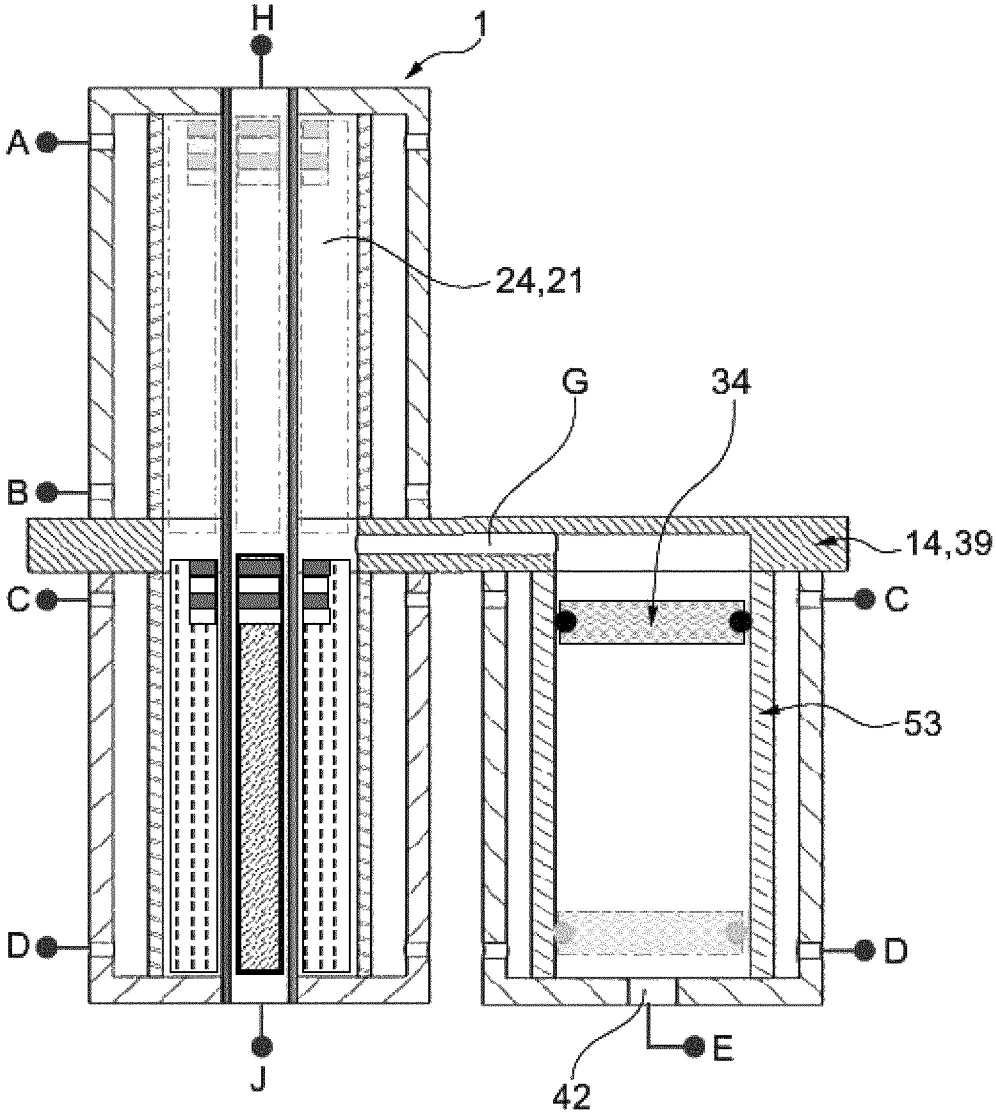
Figure 12:
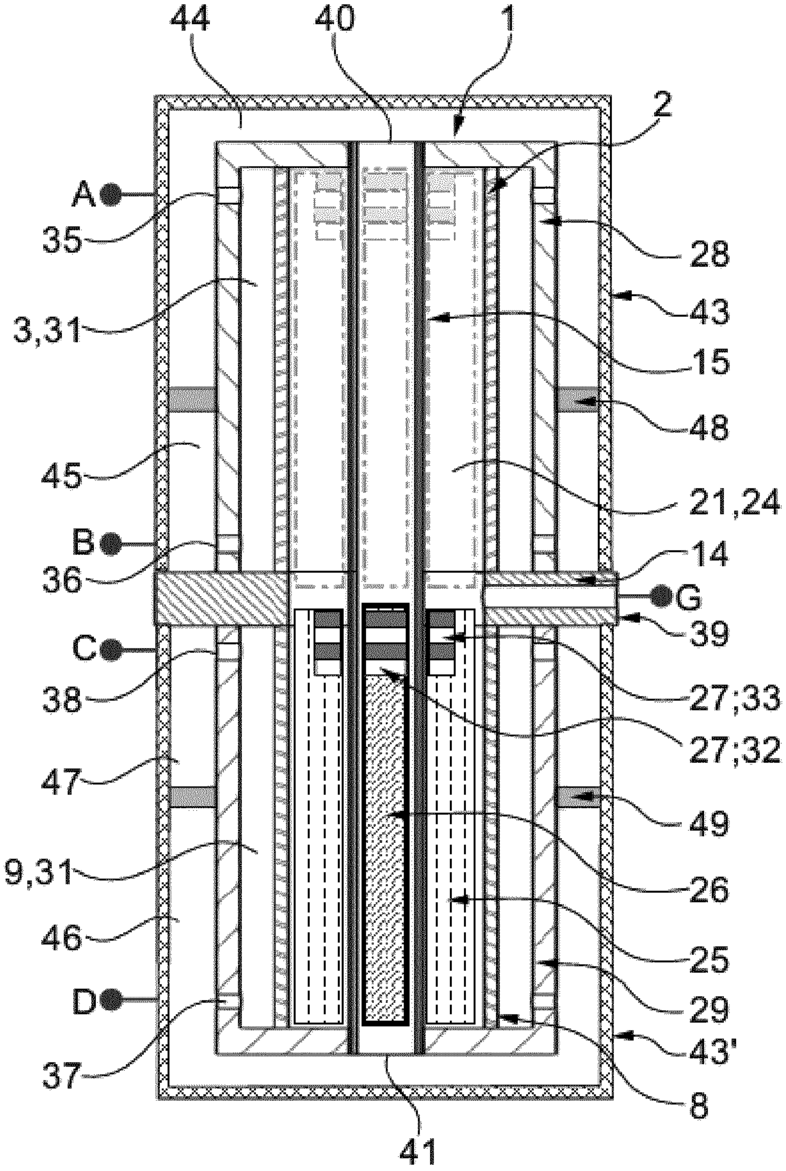
Figure 13:
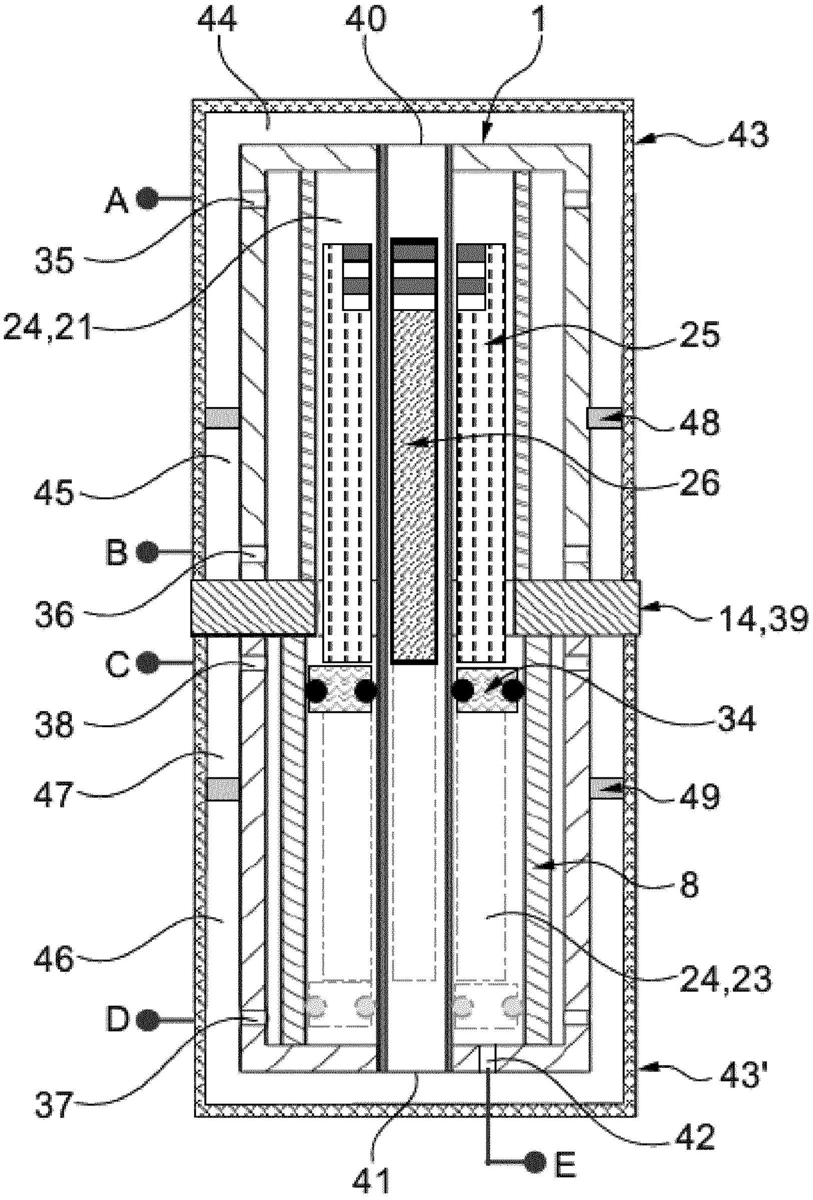
Figure 14:
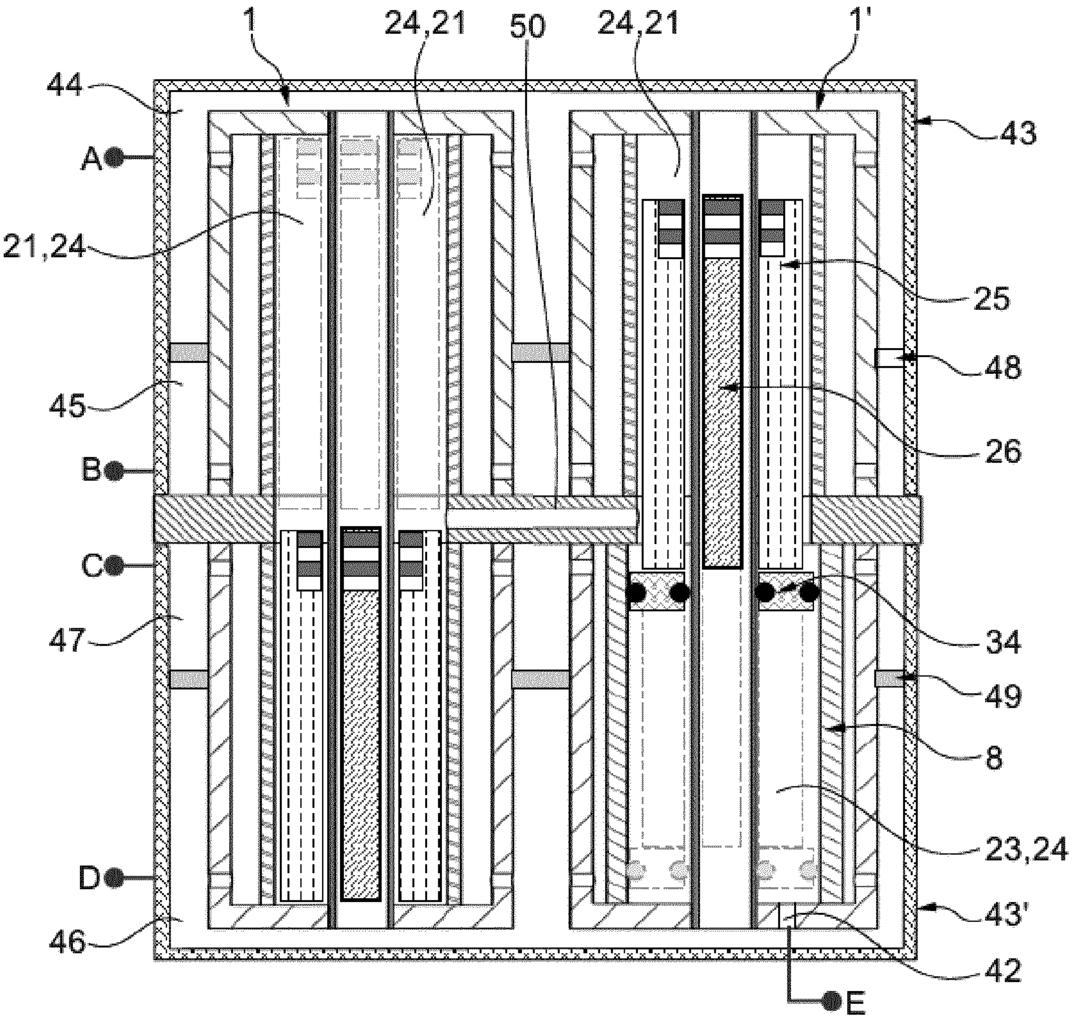
Figure 15:
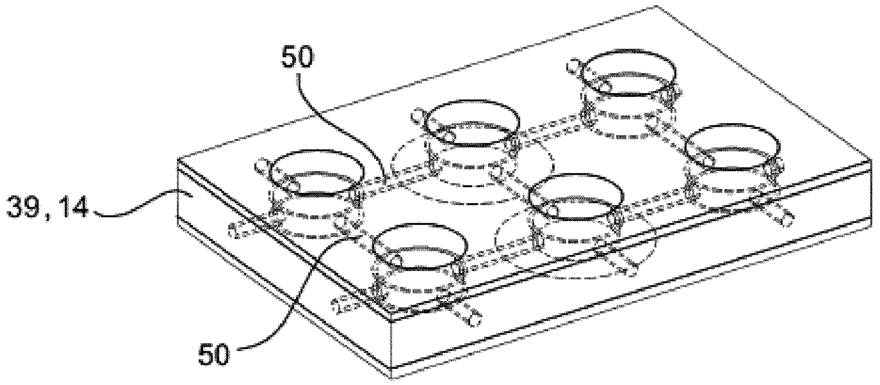
Figure 16:
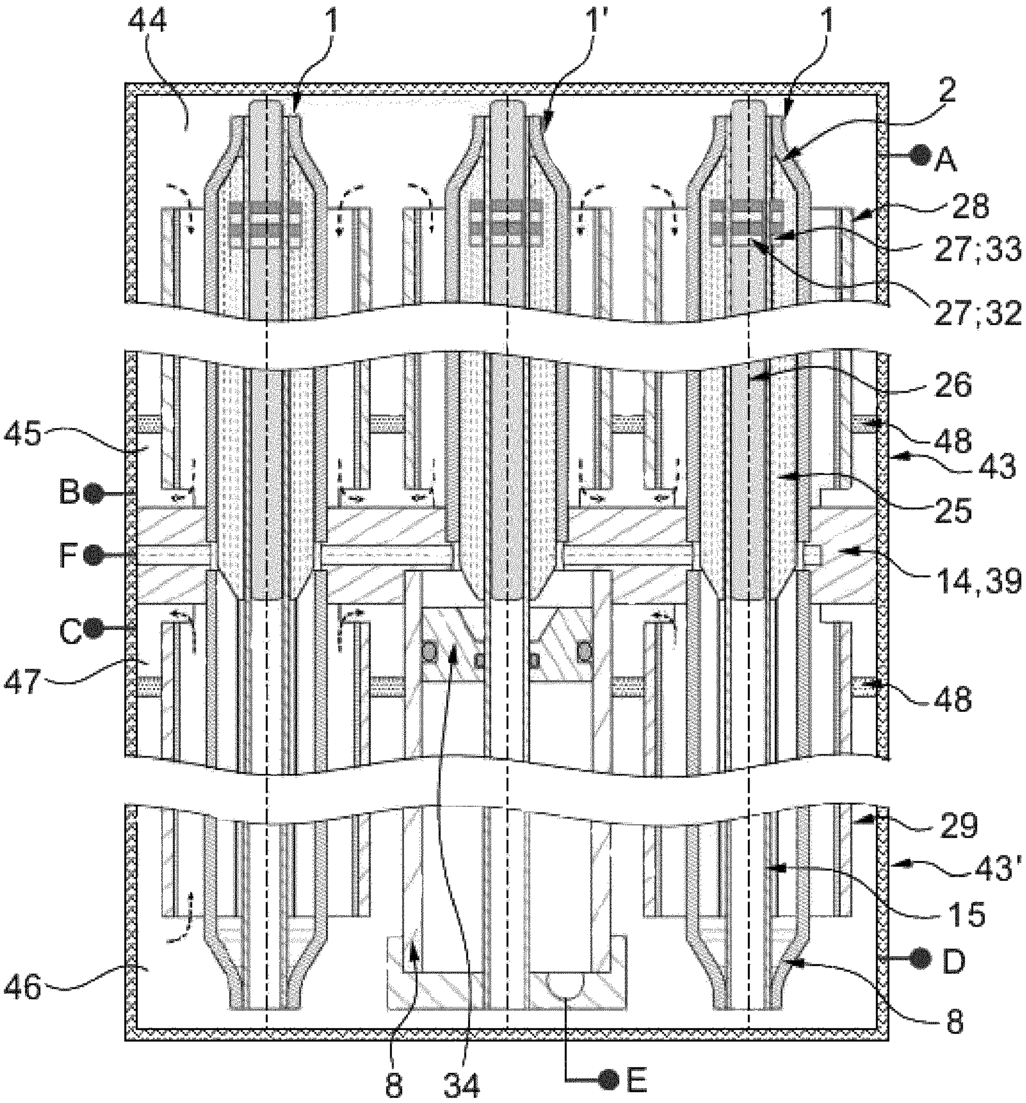
Figure 17:
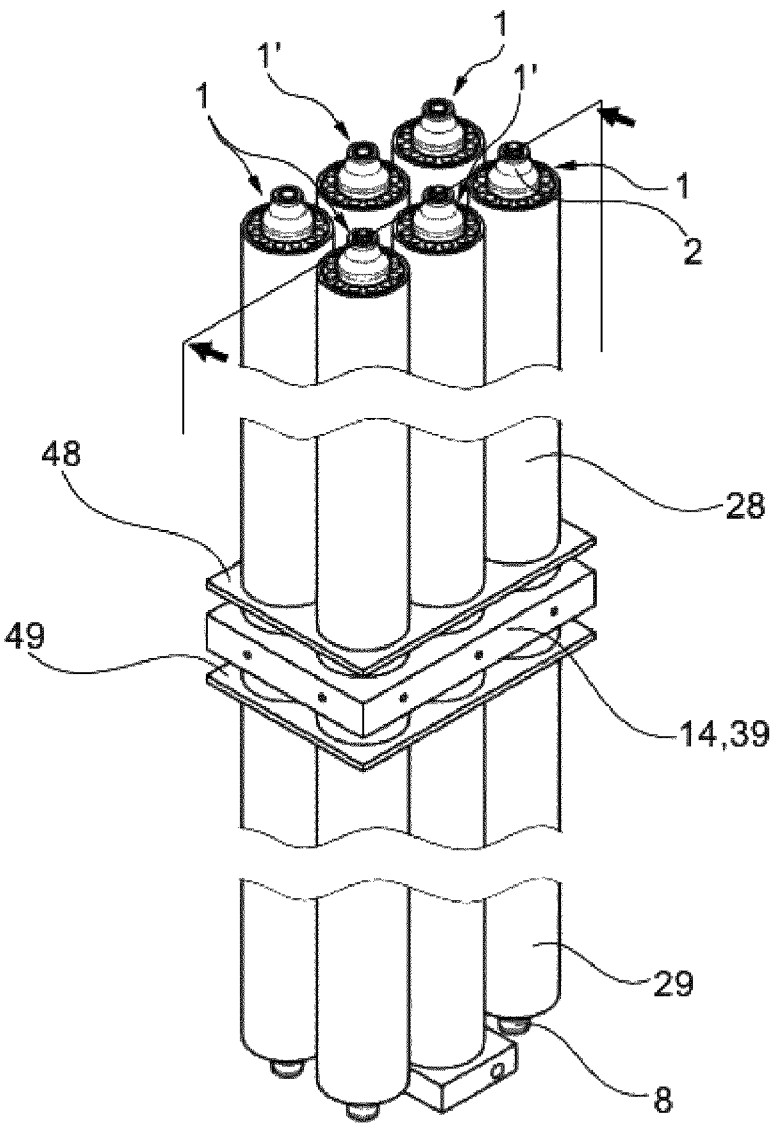
Figure 18:
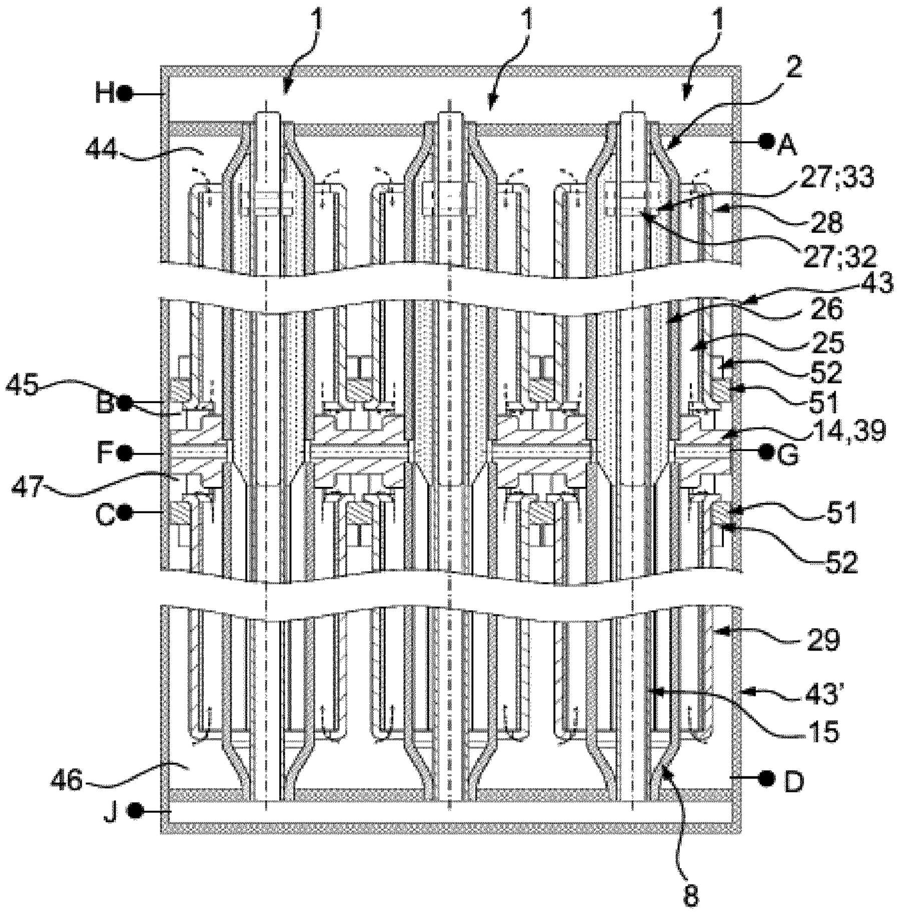
Figure 19:
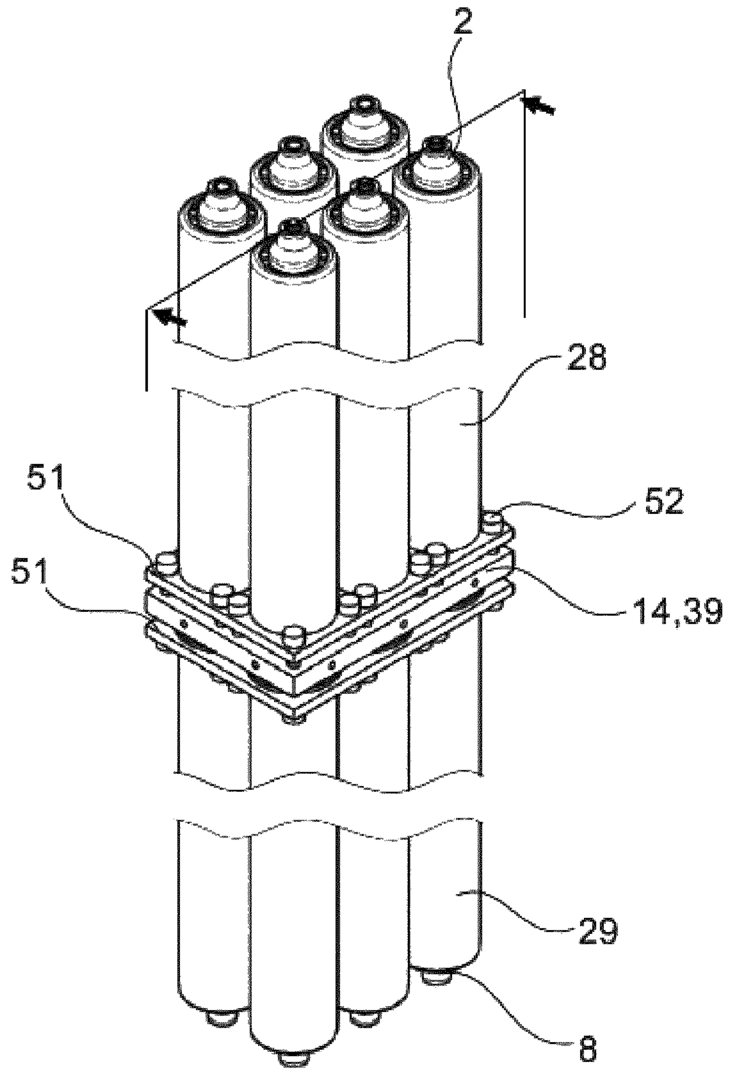

FIG. 11 shows a cross-sectional view of a cartridge according to FIG. 1 connected to a hydraulic piston according to a fourth variant of the invention, FIG. 12 shows a cross-sectional view of a module comprising a cartridge as shown in FIG. 1, FIG. 13 shows a cross-sectional view of a module comprising a so-called hybrid cartridge as shown in FIG. 10, FIG. 14 shows a cross-sectional view of a module comprising a cartridge as per FIG. 1 and a so-called hybrid cartridge as per FIG. 10, FIG. 15 shows a junction plate, FIG. 16 shows a cross-sectional view of a module comprising four cartridges as per FIG. 4 and two so-called hybrid cartridges as per the invention, FIG. 17 shows a perspective view of the module shown in FIG. 16, FIG. 18 shows a cross-sectional view of a module comprising six cartridges as shown in FIG. 3, FIG. 19 shows a perspective view of the module shown in FIG. 18.

In accordance with the invention and as illustrated in particular in FIGS. 1 to 9, a cartridge 1, 1' for moving a thermodynamic fluid between a cold part connected to a first heat source and a hot part connected to a second heat source for a thermodynamic cycle heat engine comprises at least:

- a first exchanger, forming a so-called cold part, comprising a first hollow section 2 including first circulation means 3 for at least one heat-transfer fluid adapted and intended to be connected to a first heat-transfer fluid supply circuit A, B connected to a first heat source, said first section 2 comprising an inner wall 4 and an outer wall 5,

- a second exchanger, forming a so-called hot part, comprising a second hollow section 8 comprising second means 9 for circulating at least one heat-transfer fluid suitable and intended for connection to a second heat-transfer fluid supply circuit C, D connected to a second heat source, said second section 8 comprising an inner wall 10 and an outer wall 11,
- a third hollow section 15 suitable and intended for connection to at least one supply circuit for at least one working fluid J, H, said third section 15 being arranged inside the first section 2 and the second section 8, said third section 15 comprising an inner wall 16 and an outer wall 17,
- at least part of the inner wall 4 of the first section 2 and a first part 20 of the outer wall 17 of the third section 15 being spaced apart and facing each other so as to form a first filling space 21,
- at least part of the inner wall 10 of the second section 8 and a second part 22 of the outer wall 17 of the third section 15 being spaced apart and facing each other to form a second filling space 23,
- at least one chamber 24 adapted and designed to contain at least one thermodynamic fluid preferably at high pressure and in the supercritical state, said chamber 24 comprising at least the first filling space 21 and the second filling space 23 which are communicating,
- at least one displacer 25 disposed inside said chamber 24 and slidably mounted relative to the outer wall 17 of said third section 15 and movable between a first position P1 and a second position P2, and configured to alternately displace said at least one thermodynamic fluid between the first filling space 21 and the second filling space 23,
- a piston 26 disposed inside said third profile 15 and slidably mounted relative to the inner wall 16 of said third profile 15 and movable between the first position P1 and the second position P2, the piston 26 being adapted and intended to be moved by said at least one working fluid J, H between the first position P1 and the second position P2, displacer 25 and piston 26 being coupled to each other.

Advantageously, the cartridge configuration 1, 1' provides a modular and scalable solution. In addition, the first profile 2 and the second profile 8 provide large internal and external exchange surfaces that contribute to the efficiency of heat transfer between the heat transfer fluid and the thermodynamic fluid. In addition, the first profile 2 and the second profile 8 can be produced at very low cost. The chamber 24, which is under pressure, preferably between 50 bar and 300 bar, preferably between 80 bar and 250 bar, and contains the displacer 25, is closed off from the low-pressure environment. The low-pressure environment corresponds to pressures preferably between 0 bar and 50 bar and preferably between 0 bar and 10 bar. The displacer 25 is thus controlled from outside chamber 24, via displacement of piston 26. In addition to its thermodynamic fluid displacement function, displacer 25 can also act as a regenerator, since the thermodynamic fluid flows around displacer 25 during displacement between the first position P1 and the second position P2. In addition, the displacer 25 can be heated or cooled by the heat transfer fluid alone, when it is static in the first position P1 or in the second position P2.

As shown in FIG. 1, the first heat transfer fluid supply circuit A, B and the second heat transfer fluid supply circuit C, D supply the external heat required to operate the heat engine, preferably by ensuring a temperature difference between the cold and hot parts. FIG. 1 shows cartridge 1 with displacer 25 and piston 26 in the first position P1. In this configuration, the thermodynamic fluid is confined between the first section 2 and the third section 15, and is therefore in the first filling space 21, in contact with the temperature of the first heat transfer fluid supply circuit A, B. The dotted line shows the second position P2 of displacer 25 and piston 26, in which the thermodynamic fluid is confined between the second section 8 and the third section 15, and is therefore in the second filling space 23, in contact with the temperature of the second heat transfer fluid supply circuit C, D. The change from the first position P1 to the second position P2, or vice versa, is controlled by the piston 26, preferably by means of a relative pressure between points H and J, thus enabling the thermodynamic fluid to move between the first filling space 21 and the second filling space 23. Preferably, a thermodynamic fluid supply outlet G connected to chamber 24 of said at least one cartridge 1 enables the high pressure differences generated inside cartridge 1 to be exploited for energy.

Chamber 24 accommodates a thermodynamic fluid that is under pressure, for example greater than 10 bar, but ideally above or equal to its critical pressure, so as to have greatly improved convective heat transfer compared with a gas close to atmospheric pressure. The improvement is typically one to two orders of magnitude, i.e. 100 to 1000 [$W/m^2 \cdot K$] instead of 10 [$W/m^2 \cdot K$] As shown in FIG. 2, the second filling space 23 for containing the high-pressure thermodynamic fluid is located between the third profile 15 and the second profile 8. In this second filling space 23, the thermodynamic fluid is preferably maintained in a supercritical state. The thermodynamic fluid may be carbon dioxide, but this example is not limitative. As illustrated in FIGS. 7, 8 and 9, the first filling space 21, which enables the thermodynamic fluid to be contained under high pressure, i.e. at pressures preferably between 50 bar and 300 bar, preferably between 80 bar and 250 bar, is located between the third profile 15 and the first profile 2. In this first filling space 21, the thermodynamic fluid is preferably maintained in a supercritical state.

Preferably, the first profile 2 and/or the second profile 8 is made of a material with high thermal conductivity, preferably between 100 Watts per meter-Kelvin and 400 Watts per meter-Kelvin, for example an aluminum or copper alloy.

Advantageously, this property of the first profile 2 and/or the second profile 8 contributes to the efficiency of heat transfer between the heat transfer fluid and the thermodynamic fluid.

Preferably, the third section 15 is preferably made of non-magnetic material and the displacer 25 and piston 26 are magnetically coupled to each other through the third section 15 by magnetic connection means 27.

Advantageously, this configuration enables the displacer 25 to be controlled from outside chamber 24 via a magnetic coupling between piston 26 and displacer 25. This magnetic coupling enables axial forces to be transmitted to the displacer 25 without mechanical contact and therefore without friction. Frictional losses and wear are thus avoided. This arrangement also helps to limit losses.

By non-magnetic we mean a material which has no magnetic properties or whose magnetic permeability is low, i.e. close to 1 and generally less than 50. For example, the third section 15 is made of stainless steel.

For example, the piston 26 comprises one or more permanent magnets 32 and the displacer 25 comprises one or more permanent magnets 33, said permanent magnets 32, 33 forming said magnetic connection means 27.

Preferably, and as illustrated in FIGS. 1, 3 and 4, said first profile 2 extends longitudinally over a first length L1 along an axis A1 and said second profile 8 extends longitudinally along the axis A1 over a second length L2.

Preferably, said second section 8 is in the extension of the first section 2 in the direction of axis A1.

For example, the first length L1 is equal to the second length L2, so as to allow symmetry of the cartridge according to the joining means 14 described below, as illustrated in FIGS. 1, 3 and 4.

Preferably, said first section 2 comprises a first end 6 and a second joining end 7, said second section 8 comprises a first end 12 and a second joining end 13, and the first section 2 and the second section 8 are joined to each other by joining means 14 at their respective second joining ends 7, 13.

Advantageously, the first profile 2 and the second profile 8 are separate from each other to avoid heat transfer, while being connected to each other by the connecting means 14. As a result, the first exchanger and the second exchanger are mounted opposite each other on the connecting means 14.

In a first embodiment of the invention illustrated in FIG. 3 and in a second embodiment of the invention illustrated in FIG. 4, the second junction ends 7, 13 on the one hand are configured to allow junction with the junction means 14 and on the other hand comprise at least one opening leading to the first/second circulation means 3, 9.

Preferably, junction means 14 have a thermal conductivity lower than the thermal conductivity of said first profile 2 and/or second profile 8.

Advantageously, junction means 14 enable thermal separation of the first section 2 and the second section 8.

Preferably, junction means 14 comprise at least one thermally insulating material arranged at least to thermally insulate said first section 2 from said second section 8 or vice versa.

Advantageously, this configuration provides better insulation between the so-called cold part and the so-called hot part of the cartridge 1, 1".

For example, as shown in FIG. 15, the junction means 14 may consist of a junction plate 39, which may be covered on each side with a layer of insulating material.

Preferably and as illustrated in FIGS. 2, 7, 8 and 9, said third section 15, said first section 2 and said second section 8, displacer 25 and piston 26 are coaxial along said axis A1.

Advantageously, this configuration defines an annular chamber 24. The third section 15 is thus arranged concentrically on a smaller diameter than the first section 2 and the second section 8.

Preferably, the third section 15 extends longitudinally along said axis A1 over a third length L3, said third length L3 being greater than the first length L1 or the second length L2 and preferably greater than or equal to the sum of the first length L1 and the second length L2.

Advantageously, in this arrangement, the third profile 15 crosses the so-called cold part and the so-called hot part of the cartridge 1, 1' over a length L3 as defined above. As a result, the displacer 25 can be moved alternately between the so-called cold part and the so-called hot part by sliding over at least part of the third length L3 of the third profile 15.

For example, the third section 15 is a cylindrical hollow tube.

Preferably, the third section 15 comprises a first end 18 and a second end 19, the first end 6 of the first section 2 and the first end 18 of the third section 15 are joined by connecting means, and the first end 12 of the second section 8 and the second end 19 of the third section 15 are joined by connecting means.

In the first embodiment of the invention shown in FIG. 3 and in the second embodiment of the invention shown in FIG. 4, the first end 6 of the first section 2 and the first end 18 of the third section 15 are attached to each other, for example, by crimping, soldering, joining or by one or more additional elements. The first end 6 of the first section 2 has a conical shape, but this example is not limitative. Similarly, the first end 12 of the second section 8 and the second end 19 of the third section 15 are attached to each other, for example, by crimping, brazing, joining or by one or more additional elements. The first end 12 of the second section 8 has a conical shape; this example is not limitative.

Preferably, the cartridge 1, 1' comprises a first radial and/or axial stress reinforcement part 28, in which the first profile 2 is clamped, and a second radial and/or axial stress reinforcement part 29, in which the second profile 8 is clamped.

The first reinforcement part 28 and the second reinforcement part 29 take up radial and/or axial pressure forces, thereby minimizing the first thickness E1 of the first profile 2 and the second thickness E2 of the second profile 8, so as to bring the heat transfer fluid as close as possible to the thermodynamic fluid. These pressure forces are due to the pressure of the thermodynamic fluid contained in chamber 24, and are exerted on the first and second profiles 2, 8.

The first reinforcement part 28 can be joined to the first profile 2, and the second reinforcement part 29 can be joined to the second profile 8, using a joining method that ensures zero radial clearance between the two parts: pressing/hardening/gluing/forming the tube by rolling or swaging.

FIG. 2 illustrates how radial forces are taken up by the second reinforcement part 29 in order to minimize the second thickness E2 of the second section 8.

FIGS. 7, 8 and 9 illustrate how radial forces are taken up by the first reinforcement part 28 in order to minimize the first thickness E1 of the first section 2.

As shown in the first embodiment illustrated in FIG. 3 and the second embodiment illustrated in FIG. 4, the first reinforcing part 28 or the second reinforcing part 29 may comprise a strapping. Preferably, the first reinforcing part 28 and the second reinforcing part 29 have a hollow cylindrical shape.

Advantageously, the first profile 2 and the second profile 8 are each assembled without play in the strapping. Radial forces are taken up by the strapping.

The strapping itself can be attached on one side to the first end 6, 12 of the first/second profile 2, 8 and on the other side to the connecting means 14.

As shown in the second embodiment illustrated in FIG. 4, the first reinforcement piece 28 or the second reinforcement piece 29 may, in addition to the strapping, comprise a flange 51 held by fastening means 52 to the first/second profile 2, 8.

Axial forces are taken up by the flange, which is particularly important for a cartridge 1, 1' whose diameter is preferably between 20 millimeters and 120 millimeters.

The flange 51 can also form a first/second dividing wall 48, 49 as described below.

In the first embodiment shown in FIG. 3, the first reinforcing part 28 or the second reinforcing part 29 comprises only the strapping, and axial forces are taken up by the first/second profiles 2, 8 and the third profile 15.

Preferably and generally speaking, the first reinforcement part 28 and/or the second reinforcement part 29 and/or the first section 2 and/or the second section 8 and/or the third section 15 is designed to take up axial forces.

For example, the first thickness E1 of the first profile 2 and/or the second thickness E2 of the second profile 8 is between 1 millimeter and 15 millimeters, preferably between 2 millimeters and 6 millimeters.

Preferably, the inner wall 4 of the first profile 2 and/or the inner wall 10 of the second profile 8 has a crenellated surface (FIGS. 7, 8 and 9) and/or a smooth surface (FIG. 2).

As shown in FIG. 2, the smooth contact surface between the second profile 8 and the thermodynamic fluid is at its simplest with a tubular geometry.

Advantageously, when the inner wall 4 and/or inner wall 10 has a crenellated surface (FIGS. 7, 8 and 9), then the surface area is increased compared with a smooth surface (FIG. 2) and heat exchange is improved. Thus, at the interface between the first profile 2 and/or the second profile 8 and the thermodynamic fluid, the exchange surface is extended.

Preferably, said first profile 2 has a first thickness E1 between the inner wall 4 and the outer wall 5 and the first profile 2 comprises in its first thickness E1 at least one channel 30 and/or at least one groove 31 forming said first circulation means 3, said at least one channel 30 and/or at least one groove 31 extending in a longitudinal direction parallel to the axis A1 and over a length L4.

Advantageously, said at least one channel 30 and/or said at least one groove 31 allows the circulation of the heat transfer fluid in the first exchanger. Channel 30 provides a substantial exchange surface between the heat transfer fluid and the first profile 2. This configuration helps to maximize heat transfer.

Preferably, said second profile 8 has a second thickness E2 between the inner wall 10 and the outer wall 11 and the second profile 8 comprises in its second thickness E2 at least one channel 30 and/or at least one groove 31 forming said second circulation means 9, said at least one channel 30 and/or at least one groove 31 extending in a longitudinal direction parallel to the axis A and over a length L5.

Advantageously, said at least one channel 30 and/or said at least one groove 31 allows the circulation of the heat transfer fluid in the second exchanger. Channel 30 provides a substantial exchange surface between the heat transfer fluid and the second profile 8, thereby maximizing heat transfer.

Preferably, said at least one channel 30 has a square or rectangular or trapezoidal (FIG. 8) or circular (FIG. 7) cross-section.

Said at least one groove 31 can be opened (FIGS. 2 and 3).

Said at least one channel 30 and/or at least one groove 31 may be rectilinear or helical.

Preferably, according to a first possibility, the cross-section of displacer 25 is smaller than the cross-section of chamber 24, so as to create a clearance J1 between displacer 25 and the inner wall 4 of the first section 2 or a clearance J2 between displacer 25 and the inner wall 10 of the second section 8 (FIGS. 2, 7, 8 and 9).

Advantageously, this clearance J1, J2 ensures the passage of the thermodynamic fluid as the displacer 25 moves. Each time the thermodynamic fluid passes through, some of its heat is transferred to the displacer 25 to perform the regeneration function.

Preferably, said clearance J1, J2 is between 0.05 millimeters and 5 millimeters, preferably between 0.1 millimeters and 1 millimeter.

According to a second possibility, the cross-section of displacer 25 is equal to the cross-section of chamber 24 and displacer 25 is at least partly made of a porous material.

The porosity of displacer 25 advantageously ensures the passage of thermodynamic fluid during displacement of displacer 25. Each time the thermodynamic fluid passes through, some of its heat is transferred to the displacer to perform the regeneration function.

Preferably, the cross-section of chamber 24 is annular and the cross-section of displacer 25 is annular (FIG. 2).

In this way, the cross-section of chamber 24 and displacer 25 are identical, minimizing dead volume.

Preferably, the displacer 25 conforms to the shape of the inner wall 4 of the first section 2 and/or the inner wall 10 of the second section 8 (FIGS. 7 and 8).

Preferably, piston 26 is a low-pressure piston. The low-pressure environment corresponds to pressures preferably between 0 bar and 50 bar, and preferably between 0 bar and 10 bar.

According to a third embodiment of the invention illustrated in FIG. 10, said cartridge 1' is called hybrid and further comprises a hydraulic piston 34 arranged inside the first filling space 21 or the second filling space 23 of said chamber 24, the first filling space 21 or the second filling space 23 being adapted and designed to contain at least one hydraulic fluid and being adapted and designed to be connected to a supply outlet for a hydraulic fluid E and said hydraulic piston 34 is slidably mounted in the direction of axis A1 relative to the outer wall 17 of said third profile 15 and movable inside the first filling space 21 or the second filling space 23 between a first position P3 and a second position P4 and configured on the one hand to be displaced by said at least one thermodynamic fluid and on the other hand to displace alternately said at least one hydraulic fluid in the first filling space 21 or the second filling space 23.

Advantageously, as illustrated in FIG. 10, it is possible to associate a hydraulic piston 34 with a cartridge 1 geometry described above in order to maintain a certain symmetry with respect to the connecting plate 39.

The special feature of this configuration is that the displacer 25 follows the position of the hydraulic piston 34, while being held in abutment against the latter during cooling phases. The hydraulic piston 34 moves in only one of the two thermal sections, either in the so-called hot section or in the so-called cold section. The hydraulic piston 34 represents the physical interface between the thermodynamic fluid and the hydraulic fluid, and need not be completely sealed if, for example, the fluids are immiscible and insoluble. This configuration simplifies integration of the hydraulic piston(s) 34 when the system is used in a module as detailed below.

According to a fourth alternative embodiment of the invention, illustrated in FIG. 11, the chamber 24 of the cartridge 1 is adapted and intended to be connected to a hydraulic piston 34 adapted and intended to be connected to a supply circuit for a hydraulic fluid E. Preferably, a thermodynamic fluid supply outlet G connected to the chamber 24 of said at least one cartridge 1 can be connected to the hydraulic piston 34 which ensures the transmission of pressure from the thermodynamic fluid to a hydraulic fluid such as oil or water or equivalent. The hydraulic piston 34 is preferably contained in a tube or cylinder. This hydraulic piston 34 is ideally maintained at temperature by being supplied by the first/second heat source, for example via the first/second supply circuit A, B/C, D. Advantageously, the thermodynamic fluid leaving the cartridge 1 continues to be cooled or heated, depending on whether the hydraulic piston 34 is supplied with a first/second heat source. Advantageously, the working fluid for the energy recovery system may be different from the thermodynamic fluid, avoiding the use of a turbine operating with a thermodynamic fluid in the supercritical phase. Similarly, one or more cartridges 1 may be connected to one or more hydraulic pistons 34. The hydraulic piston(s) 34 may be outside the module described below or inside the module described below in order to centralize the heat supply.

The invention also relates to a module for moving a thermodynamic fluid alternately between a cold part connected to a first heat source and a hot part connected to a second heat source for a thermodynamic cycle heat engine, characterized in that it comprises at least one cartridge 1, 1' or a plurality of cartridges 1, 1' according to the invention and described above, and in that it comprises:

- a first heat transfer fluid supply circuit A, B connected to said first circulation means 3 of said at least one cartridge 1, 1' via at least one first supply port 35 and at least one second supply port 36 of the first circulation means 3,
- a second heat transfer fluid supply circuit C,D connected to said second circulation means 9 of said at least one cartridge 1 via at least one third supply port 37 and at least one fourth supply port 38 of the second circulation means 9,
- a junction plate 39 comprising at least said cartridge 1 junction means 14,
- a working fluid supply circuit H, J, connected to said third section 15 of said at least one cartridge 1 by at least one fifth supply port 40 included in the third section 15 and at least one sixth supply port 41 included in the third section 15, arranged to pilot the displacement of the piston 26,
- a thermodynamic fluid supply outlet G connected to chamber 24 of said at least one cartridge 1 or a hydraulic fluid supply outlet E connected to first filling space 21 or second filling space 23 of said chamber 24.

Advantageously, the module can comprise one or more cartridges 1, 1' depending on the desired heat engine output. The size of the module can be adapted to the number of cartridges 1, 1' to be integrated for a targeted power output of the heat engine.

In the example shown in FIG. 12, the module comprises a single cartridge 1.

In the example shown in FIGS. 18 and 19, the module comprises six cartridges 1.

Preferably, the module comprises at least one previously described hybrid cartridge 1' comprising a hydraulic piston 34 arranged inside the first filling space 21 or the second filling space 23 of said chamber 24.

In the example shown in FIG. 13, the module comprises a single hybrid cartridge 1'. Compared with the module shown in FIG. 12 without a hydraulic piston, however, the exchange surface is no longer symmetrical between the hot and cold parts.

In the example shown in FIG. 14, the module comprises a cartridge 1 and a so-called hybrid cartridge 1'. Compared with the module shown in FIG. 12 without a hydraulic piston, however, the exchange surface is no longer symmetrical between the hot and cold parts. This lack of symmetry can be partially compensated for in the multiple cartridge module 1, 1' by using a ratio of a so-called hydride cartridge 1' combined with several basic cartridges 1 without hydraulic piston 34. The hydraulic piston 34 of the so-called hybrid cartridge 1' then takes over the expansion of several cartridges 1 without hydraulic piston 34.

For example, as shown in FIGS. 16 and 17, the module integrates six cartridges 1, 1' with a ratio of two cartridges 1 without hydraulic piston 34 for one so-called hybrid cartridge 1'.

Preferably, the module comprises two insulating casings separated by junction plate 39 and accommodating at least part of said at least one cartridge 1, 1' or plurality of cartridges 1, 1'.

The two insulating casings can be delimited by one or more casings.

Advantageously, each insulating casing is directly connected to the first or second heat source, which enables said at least one cartridge 1, 1' or plurality of cartridges 1, 1' to be supplied centrally with heat transfer fluid instead of having to supply each cartridge 1, 1' individually.

The size of the two insulating casings can be adapted to the number of cartridges 1, 1' to be integrated for a targeted heat engine output.

Preferably, the working fluid supply circuit H, J is formed by said first heat transfer fluid supply circuit A, B and said second heat transfer fluid supply circuit C, D.

In this case, the working fluid supply source H, J at the fifth supply port 40 is identical to that of the first heat transfer fluid supply circuit A, B, just as the working fluid supply source at the sixth supply port 41 is identical to that of the second heat transfer fluid supply circuit C, D. As a result, the relative pressure difference between the first heat transfer fluid supply circuit A, B and the second heat transfer fluid supply circuit C, D enables the piston 26 to be actuated.

Preferably and alternatively, the working fluid supply circuit H, J is separate from said first heat transfer fluid supply circuit A, B and said second heat transfer fluid supply circuit C, D (FIGS. 18 and 19).

Preferably, the connection plate 39 has a lower thermal conductivity than the thermal conductivity of said first profile 2 and/or second profile 8.

Advantageously, the junction plate 39 has a thermal separation function.

Preferably, the connection plate 39 is made of steel-type metal

Preferably, the first reinforcement piece 28 and the second reinforcement piece 29 are attached to the connecting plate 39, respectively.

Preferably and as illustrated in FIGS. 12, 13 and 14, the module comprises a first insulating casing 43 which includes at least one first compartment 44 into which leads said at least one first supply port 35 of the first circulation means 3 and at least one second compartment 45 into which leads said at least one second supply port 36 of the first circulation means 3.

Preferably additionally or alternatively and as illustrated in FIGS. 12, 13 and 14, the module comprises a second insulating casing 43' which comprises at least one third compartment 46 into which leads said at least one third supply port 37 of the second circulation means 9 and at least one fourth compartment 47 into which leads said at least one fourth supply port 38 of the second circulation means 9.

Preferably, the second reinforcement part 29 comprises said third supply port 37 and said fourth supply port 38 of the second circulation means 9.

As a result, the first insulating casing 43 comprises a so-called cold part of the cartridge 1, 1' and is designed to receive the heat transfer fluid coming from the first heat source to supply the first heat transfer fluid supply circuit A, B. As a result, the second insulating casing 43' comprises a so-called hot part of the cartridge 1, 1' and is designed to receive the heat transfer fluid coming from the second heat source to supply the second heat transfer fluid supply circuit C, D.

Preferably, the junction plate 39 separates the first casing 43 from the second casing 43'.

Preferably, the first reinforcement piece 28 comprises said first supply port 35 and said second supply port 36 of the first circulation means 3.

This configuration allows the first/second reinforcement 28, 29 and the first/second profile 2, 8 to be immersed in the heat transfer fluid.

The first compartment 44 and the second compartment 45 are preferably delimited by at least one first separating wall 48.

The third compartment 46 and the fourth compartment 47 are preferably delimited by at least one second dividing wall 49.

The first dividing wall 48 and/or the second dividing wall 49 act as hydraulic shutters and preferably do not withstand high mechanical stresses.

The first dividing wall 48 and/or the second dividing wall 49 are preferably made of plastic or elastomer materials, although these examples are not limitative.

The first supply port 35 and the second supply port 36 are arranged on either side of the first separating wall 48, which ensures that the flow of heat transfer fluid between A and B takes place inside the first reinforcing part 28 between the latter and the first profile 2, and not outside the first reinforcing part 28.

The third supply port 37 and the fourth supply port 38 are arranged on either side of the first separating wall 48, which ensures that the flow of heat transfer fluid between C and D takes place inside the second reinforcing part 29 between the latter and the second profile 8, and not outside the second reinforcing part 29.

Preferably, said at least one fifth supply port 40 of the H, J working fluid supply circuit leads into the first compartment 44 and said at least one sixth supply port 41 of the H, J working fluid supply circuit leads into the third compartment 46.

In this case, the working fluid supply source H, J at the fifth supply port 40 is identical to that of the first heat transfer fluid supply circuit A, B, just as the working fluid supply source at the sixth supply port 41 is identical to that of the second heat transfer fluid supply circuit C, D.

As shown in FIG. 14, the module may comprise at least two cartridges 1, 1' and the chambers 24 of each cartridge 1 are interconnected by at least one interconnection line 50, preferably arranged in said at least one junction plate 39 and the thermodynamic fluid supply outlet G of the module or the hydraulic fluid supply outlet E of the module is preferably arranged in said junction plate 39.

Advantageously, said at least one interconnection duct 50 enables interconnection of each chamber 24 of each cartridge 1, 1'.

The invention also relates to a heat engine adapted and intended to perform at least one conversion of thermal energy into mechanical energy comprising at least one thermodynamic fluid preferably in the supercritical state and adapted and intended to implement a thermodynamic cycle comprising at least one isochoric heating phase, optionally an isobaric heating phase, an expansion phase and an isobaric cooling phase, the heat engine comprising at least one module according to the invention described above.

Of course, the invention is not limited to the embodiments described and shown in the appended drawings. Modifications remain possible, in particular with regard to the constitution of the various elements or by substitution of technical equivalents, without however departing from the field of protection of the invention.

The invention claimed is:

1. Cartridge for moving a thermodynamic fluid between a cold part connected to a first heat source and a hot part connected to a second heat source for a thermodynamic cycle heat engine, comprising at least:

a first exchanger, forming a “cold” part, comprising a first hollow section comprising first means for circulating at least one heat-transfer fluid suitable and intended for connection to a first heat-transfer fluid supply circuit connected to a first heat source, said first section comprising an inner wall and an outer wall, a second heat exchanger, forming a hot section, comprising a second hollow section including second means for circulating at least one heat-transfer fluid, adapted and designed to be connected to a second heat-transfer fluid supply circuit connected to a second heat source, said second section comprising an inner wall and an outer wall, a third hollow section adapted and intended to be connected to at least one supply circuit for at least one working fluid, said third section being disposed inside the first section and the second section, said third section comprising an inner wall and an outer wall, at least part of the inner wall of the first section and a first part of the outer wall of the third section being spaced apart and facing each other so as to form a first filling space, at least part of the inner wall of the second section and a second part of the outer wall of the third section being spaced apart and facing each other to form a second filling space, at least one chamber suitable and designed to contain at least one thermodynamic fluid at high pressure and in the supercritical state, said chamber comprising at least the first filling space and the second filling space which are communicating, at least one displacer arranged inside said chamber and slidably mounted relative to the outer wall of said third profile and movable between a first position and a second position, and configured to alternately displace said at least one thermodynamic fluid between the first filling space and the second filling space, a piston disposed inside said third profile and slidably mounted relative to the inner wall of said third profile and movable between the first position and the second position, the piston being adapted and designed to be displaced by said at least one working fluid between the first position and the second position, the displacer and the piston being coupled to one another.

2. Cartridge according to claim 1, wherein the third profile is made of non-magnetic material and wherein the displacer and the piston are magnetically coupled to each other through the third profile by magnetic connecting means.

3. Cartridge according to claim 1, wherein said first profile extends longitudinally over a first length along a first axis and wherein said second profile extends longitudinally along the axis over a second length.

4. Cartridge according to claim 3, wherein the third profile extends longitudinally along said first axis over a third length, said third length being greater than the first length or the second length and greater than or equal to the sum of the first length and the second length.

5. Cartridge according to claim 1, wherein said second profile is in the extension of the first profile in the direction of the first axis.

6. Cartridge according to claim 1, wherein said first profile comprises a first end and a second joining end, wherein said second profile comprises a first end and a second joining end, and wherein the first profile and the second profile are joined to each other by joining means at their respective second joining end.

7. Cartridge according to claim 6, wherein said third section comprises a first end and a second end, wherein the first end of the first section and the first end of the third section are joined by connecting means, and wherein the first end of the second section and the second end of the third section are joined by connecting means.

8. Cartridge according to claim 1, wherein said third profile, said first profile and said second profile, the displacer and the piston are coaxial along said first axis.

9. Cartridge according to claim 1, comprising a first radial and/or axial stress-reinforcing part in which the first profile is strapped and a second radial and/or axial stress-reinforcing part in which the second profile is strapped.

10. Cartridge according to claim 6, wherein the joining means have a thermal conductivity lower than the thermal conductivity of said first profile and/or second profile.

11. Cartridge according to claim 1, wherein said first profile has a first thickness between the inner wall and the outer wall and wherein the first profile comprises in its first thickness at least one channel and/or at least one groove forming said first circulation means, said at least one channel and/or at least one groove extending in a longitudinal direction parallel to the axis and over a first length and/or wherein said second section has a second thickness between the inner wall and the outer wall and wherein the second section comprises in its second thickness at least one channel and/or at least one groove forming said second circulation means, said at least one channel and/or at least one groove extending in a longitudinal direction parallel to axis and over a second length.

12. Cartridge according to claim 1, wherein said cartridge comprises a hydraulic piston arranged inside the first filling space or the second filling space of said chamber, the first filling space or the second filling space being adapted and designed to contain at least one hydraulic fluid and being adapted and designed to be connected to a hydraulic fluid supply outlet and wherein said hydraulic piston is mounted so as to slide in the direction of axis relative to the outer wall of said third profile and movable within the first filling space or the second filling space between a first position and a second position and configured on the one hand to be displaced by said at least one thermodynamic fluid and on the other hand to displace alternately said at least one hydraulic fluid in the first filling space or the second filling space.

13. Cartridge according to claim 1, wherein the first profile and/or the second profile is made of a material with high thermal conductivity between 100 Watts per meter-Kelvin and 400 Watts per meter-Kelvin, including an aluminum or copper alloy.

14. Module for moving a thermodynamic fluid alternately between a cold part connected to a first heat source and a hot part connected to a second heat source for a thermodynamic cycle heat engine, wherein said module comprises at least one cartridge or a plurality of cartridges according to claim 1, and wherein said module comprises:

- a first heat-transfer fluid supply circuit connected to said first circulation means of said at least one cartridge by at least one first supply port and at least one second supply port of the first circulation means,
- a second heat-transfer fluid supply circuit connected to said second circulation means of said at least one cartridge by at least one third supply port and at least one fourth supply port of the second circulation means,
- a junction plate comprising at least said junction means of the cartridge,
- a working fluid supply circuit, connected to said third profile of said at least one cartridge by at least one fifth supply port included in the third profile and at least one sixth supply port included in the third profile, arranged to pilot the displacement of the piston,
- a thermodynamic fluid supply outlet connected to the chamber of said at least one cartridge or a hydraulic fluid supply outlet connected to the first filling space or to the second filling space of said chamber.

15. Module according to claim 14, comprising at least one cartridge according to claim 1, the cartridge comprising a hydraulic piston arranged inside the first filling space or the second filling space of said chamber.

16. Module according to claim 14, wherein the working fluid supply circuit is formed from said first heat transfer fluid supply circuit and said second heat transfer fluid supply circuit.

17. Module according to claim 14, wherein the junction plate has a lower thermal conductivity than the thermal conductivity of said first profile and/or second profile.

18. Module according to claim 14, wherein a first insulating casing comprises at least one first compartment into which leads said at least one first supply port of the first circulation means and at least one second compartment into which leads said at least one second supply port of the first circulation means and/or wherein a second insulating casing comprises at least one third compartment into which leads said at least one third supply port of the second circulation means and at least one fourth compartment into which leads said at least one fourth supply port of the second circulation means.

19. Module according to claim 15, wherein said at least one fifth supply port of the working fluid supply circuit leads into the first compartment and wherein said at least one sixth supply port of the working fluid supply circuit leads into the third compartment.

20. Module according to claim 15, wherein the module comprises at least two cartridges and wherein the chambers of each cartridge are interconnected by at least one interconnecting pipe, and arranged in said at least one junction plate, and wherein the thermodynamic fluid supply outlet of the module or the hydraulic fluid supply outlet of the module is arranged in said junction plate.

* * * * *